July 16, 1957  H. J. SIEKMANN ET AL  2,799,186
CABLE CARRIER FOR LONG BED MACHINE TOOLS
Filed April 16, 1956  5 Sheets-Sheet 1

INVENTORS.
HAROLD J. SIEKMANN AND
BY  WILLIAM KIMSEY

Willard L. Groene
ATTORNEY.

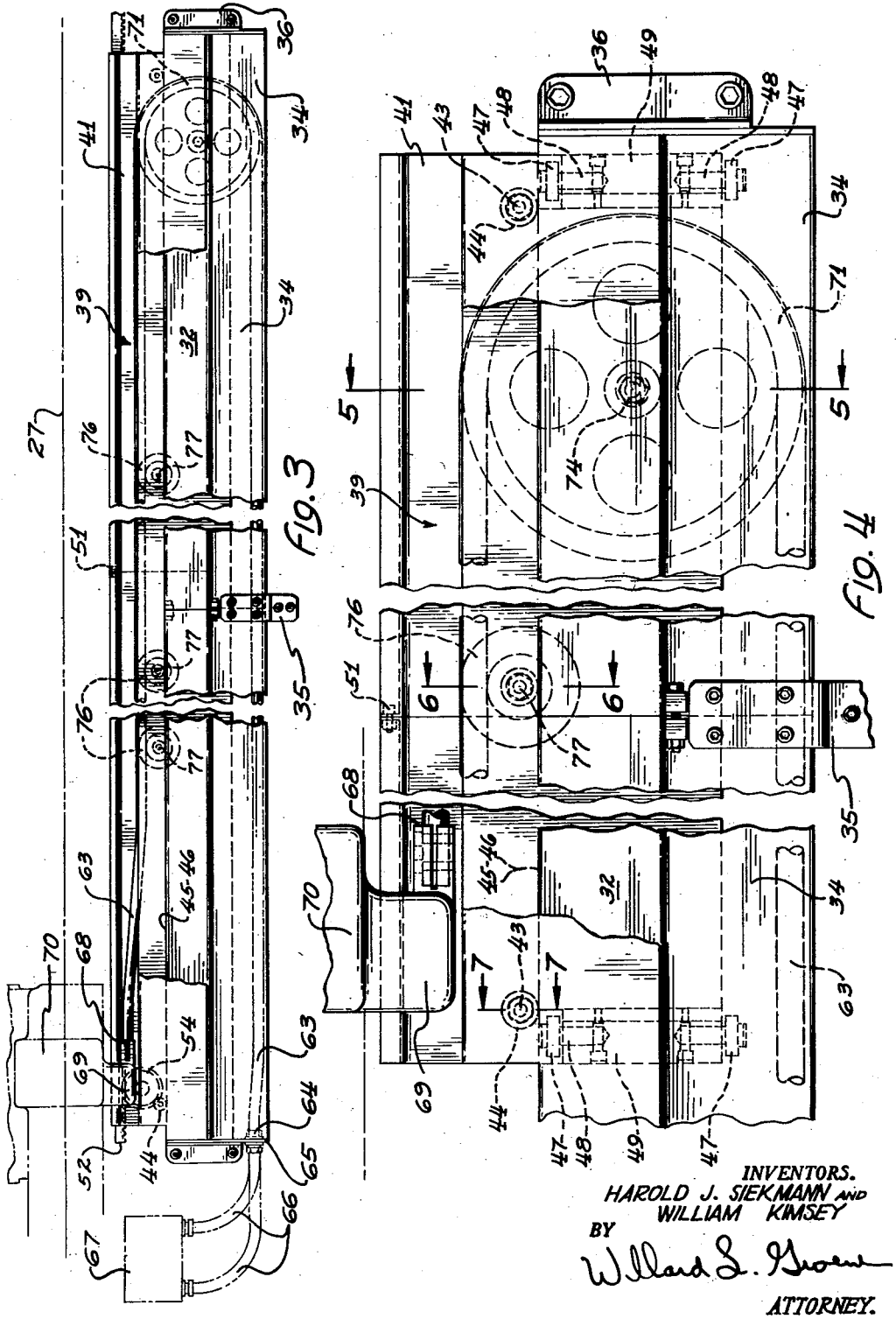

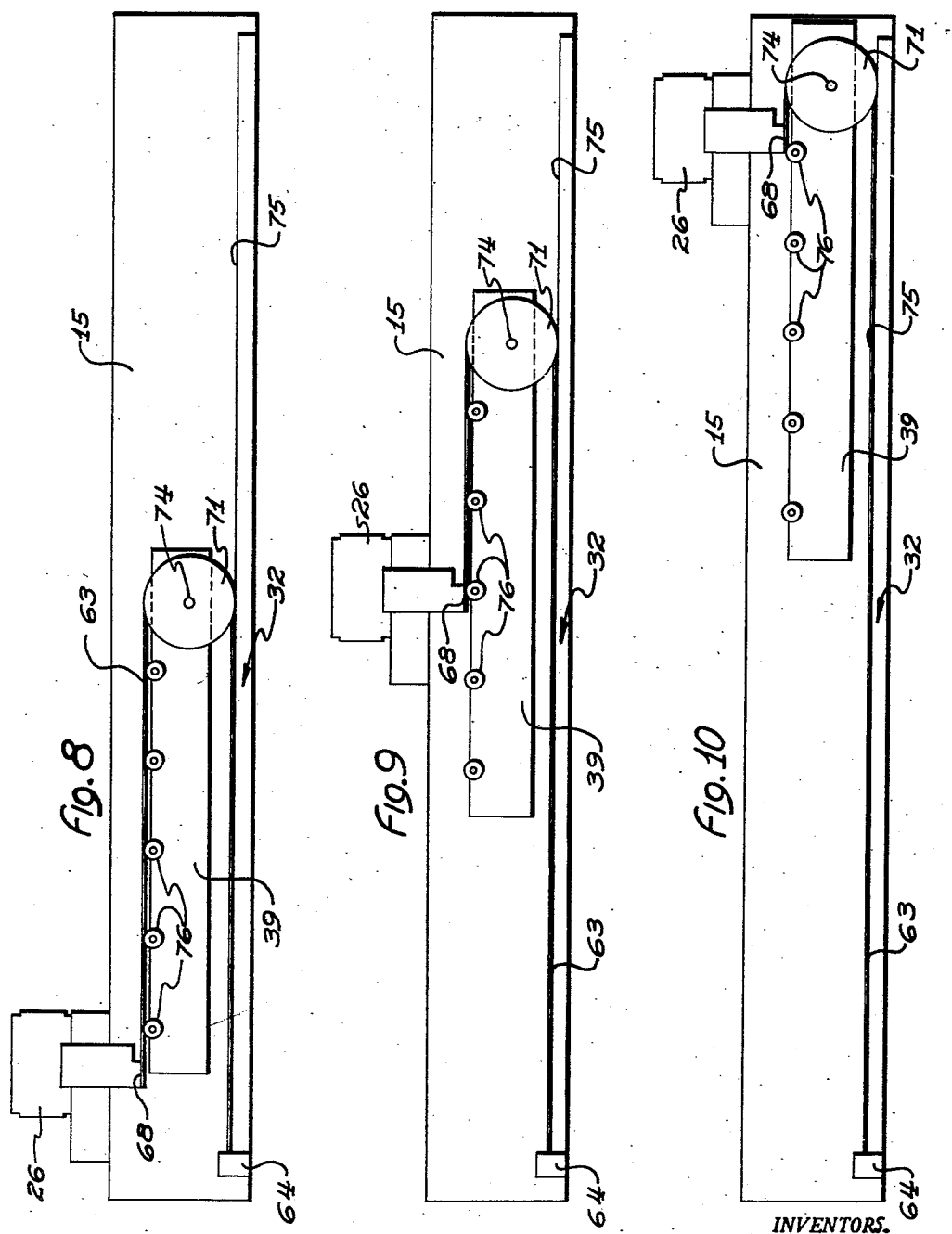

United States Patent Office 2,799,186
Patented July 16, 1957

2,799,186

CABLE CARRIER FOR LONG BED MACHINE TOOLS

Harold J. Siekmann and William A. Kimsey, Cincinnati, Ohio, assignors to The R. K. Le Blond Machine Tool Co., Cincinnati, Ohio, a corporation of Delaware Application April 16, 1956, Serial No. 578,350

3 Claims. (Cl. 77—3)

This invention pertains to improvements in power cable carriers for energizing the moving elements of long bed machine tools and is particularly directed to an improved cable carrier for such machine tools as long bore lathes, gun boring lathes, and tube boring machines and the like.

One of the problems in machine tools of this type is that of applying the power and control energy to the various moving elements which travel along the relatively long bed of such machines. In a machine of this type the bed is frequently 100 feet or longer and it is necessary to very precisely control the movement of the machine elements or tool carriage on the bed of such a machine from a remote operator position of the equipment. In modern day machine tools a great number of electrical wires are required to control the speed, reversal, clamping, and many other functions of the movable machine elements and in a machine of this type where this must be done from a relatively great remote distance the problem becomes manifold in handling the power cables connected to the distant moving elements.

In previous machines of this type it has been the general practice to do nothing about supporting the long power supply leads but to allow them to lie on the floor at each side of the machine tool as the boring carriage or tool element moved relatively along the bed. As a result this presented a hazard to the operator of the machine who frequently tripped over the entangled power cable and it also presented a bad problem of the chips and coolant which fell on the floor becoming entangled with the power cables and the abrasive action of the chips and the floor upon which the cables were dragged resulted in ultimate damage to the cables and mal-functioning of the machine tool.

Therefore, one of the objects of this invention is to provide an improved cable carrier for a long bed machine tool which maintains the cable supplying power to the movable machine element in a taut and precise position free of kinks or fouling for the complete movement of the tool element along the bed of the machine.

Still another object of this invention is to provide a cable carrier which automatically follows the movable machine element to which it supplies power and control functions and which is totally enclosed and free from exposure to chips and coolant of the machine tool.

Still another object of this invention is to provide an improved cable carrier for a long bed machine tool which maintains the cable in proper stretched condition without kinking or damage resulting to the cable structure under all positions of operation of the machine elements on the bed of the machine.

Further features and advantages of this invention will appear from a detailed description of the drawings in which:

Fig. 3 is an enlarged fragmentary front elevation of the machine shown in Fig. 2.

Fig. 4 is an enlarged fragmentary elevation particularly showing the details of the cable carriage of the machine.

Fig. 8 is a diagram showing the position of the essential elements of the carriage travel at the beginning of a cut with the machine.

Fig. 9 is a diagram similar to Fig. 8 at an intermediate stage of carriage travel.

Fig. 10 is a diagram similar to Figs. 8 and 9 showing the position of the elements at the conclusion of the cut travel of the carriage.

Figure 1:
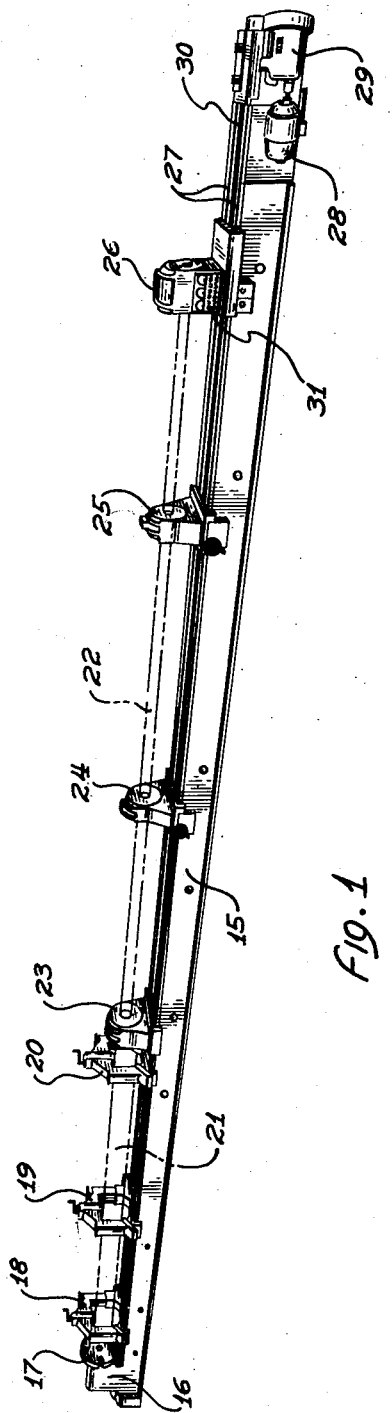
Fig. 1 is a front perspective view of a long bore lathe incorporating the features of this invention.
Figure 11:
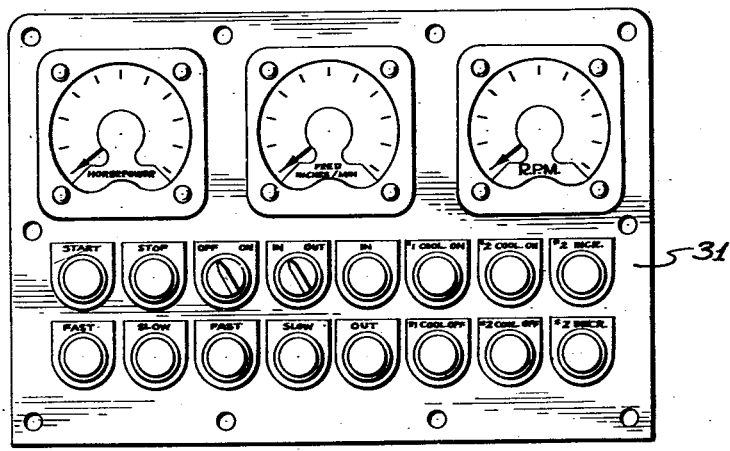
Fig. 11 is a view of the control panel mounted on the bar driving carriage of the machine.

A lathe to which this invention is particularly applicable is that shown in Fig. 1 comprising a long bed 15 on the left hand end of which is fixed the work driving headstock 16 having a suitable rotatable work spindle 17 adapted to grip and rotate the work piece to be bored. A plurality of work steady rests 18, 19 and 20 rotatably support the tubular work piece 21 driven by the headstock 16. The boring bar 22 is supported at its outer end in the coolant seal rest 23 and is also supported intermediate its length in the boring bar support rests 24 and 25. The rear end of the boring bar 22 is clamped to the boring bar driving carriage 26 which is slidably mounted on the bed ways 27 by a suitable drive motor 28, transmission 29 and the screw 30 actuated from the transmission, which screw in turn operates in a suitable nut (not shown) fixed to the bottom of the boring bar driving carriage 26. A control panel 31, shown in detail in Fig. 11, is mounted on the front of the boring bar driving carriage and therefore travels with this carriage during the operation of the machine. This control panel is capable of controlling the operation of the headstock driving mechanism, the actuating motor 28 and transmission 29 for feeding the boring bar driving carriage 26 and also has control means for adjusting the coolant supply to the coolant seal boring bar rest 23. These controls are all arranged for a very nicety of adjustment because it is essential in a long bore operation of this type that the spindle speed for rotation of the work, the speed of feed of the carriage, and the fluid pressure of the coolant be very carefully coordinated and interrelated so that the proper cutting action and finish and speed of operation can be obtained from the machine. Because of the variations in materials and the change in these characteristics in boring through a single piece, the operator must at all times be able to instantly and carefully adjust from the control panel 31 all of the functions of the machine. It therefore is necessary to provide electrical cable connections from the moving boring bar driving carriage 26 to all of the other machine elements and coupled with the relatively long bed 15 of the lathe and the large amount of movement of the carriage 26 it is necessary to provide some means to keep these cables from becoming entangled in themselves and in interfering with the operation of the machine for the reasons above pointed out.

Figure 2:
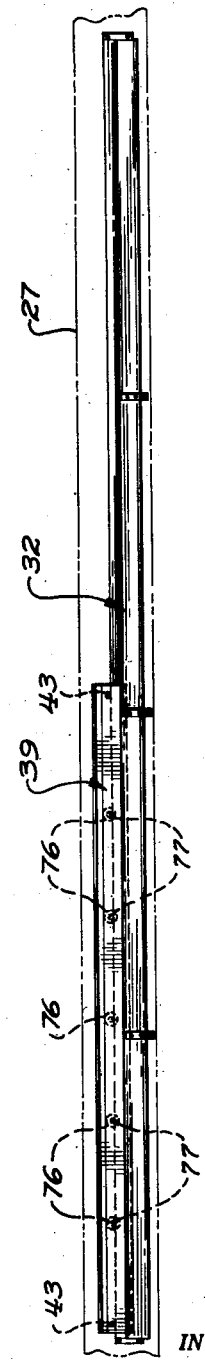
Fig. 2 is a rear elevation of the machine shown in Fig. 1.
Figure 5:
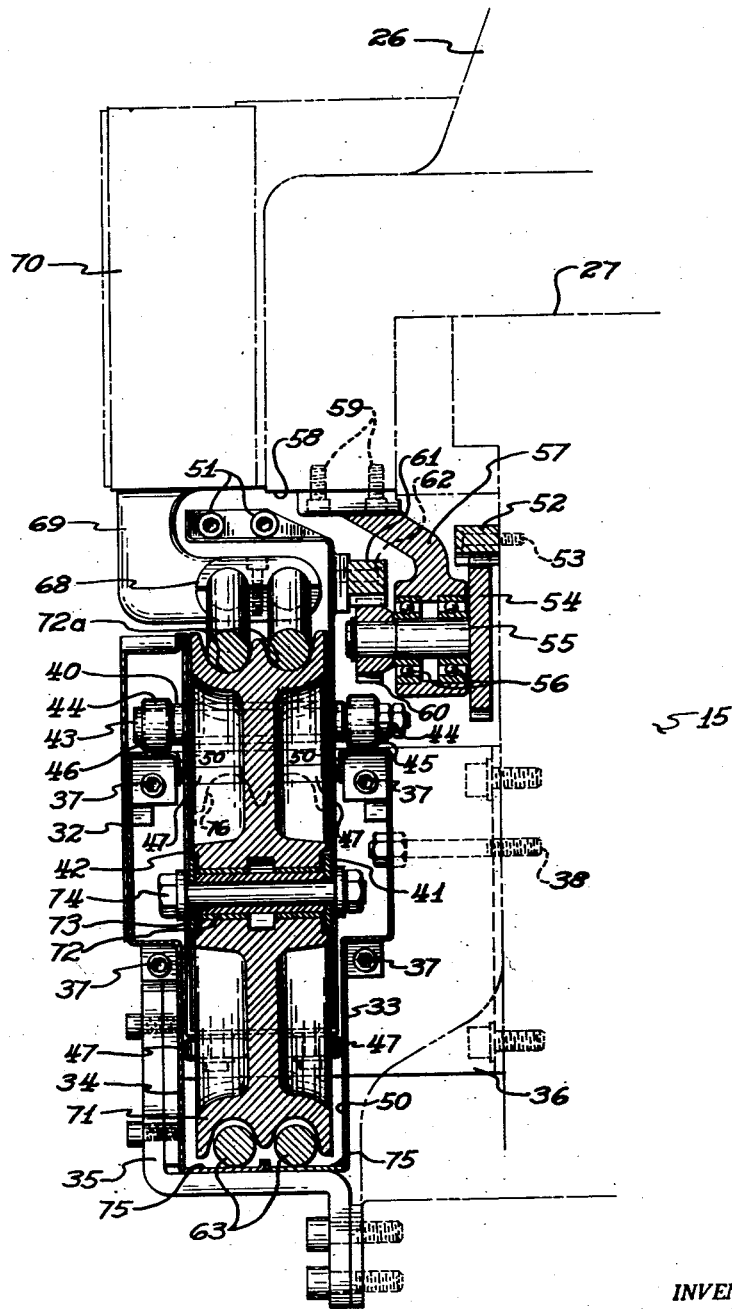
Fig. 5 is an enlarged transverse section on the line 5—5 of Fig. 4.

To this end there is provided along the back of the bed 15 a trough indicated generally at 32, Fig. 2, comprising the rear plate member 33, Fig. 5, and the front plate member 34 which are suitably mounted on the intermediate brackets 35 and the end brackets 36 to the bed of the machine, the members 33 and 34 being made in two pieces bolted together by suitable screws 37 intermediate the length of the trough 32. The trough 32 may be further steadied by the tie bolts 38 connected between the rear plate members 33 and the bed of the lathe.

A cable control carriage indicated generally at 39 is of substantially half the length of the trough 32 and is provided with a series of tie members or tubes 40 which inter-connect the side plates comprising the rear plate 41 and the front plate 42 through which are passed the bolts 43 on the outer ends of which are mounted the anti-friction rollers 44, the periphery of which rollers ride on the top surfaces 45 and 46 of the rear plate member and front plate member respectively of the trough 32, to provide vertical support for the cable control carriage 39 as it rolls along the trough 32. Suitable vertical guide rollers 47, Figs. 4 and 5, carried on studs 48 in the end blocks 49 on the cable control carriage 39 serve to stabilize and sidewise guide the carriage 39 against the surfaces 50 of the trough 32. The sides 41 and 42 of the cable control carriage 39 are made of two pieces and joined together and clamped intermediate their ends by suitable clamping screws 51.

The cable control carriage 39 is moved along the trough 32 at one half the rate of travel of the boring bar driving carriage 26 by an arrangement comprising a rack 52, Fig. 5, fixed to the bed 15 of the machine by suitable screws 53 which rack is engaged by the gear 54 fixed on the shaft 55 which is journalled by suitable bearings 56 in the bracket 57 fixed to the surface 58 of the boring bar driving carriage 26 by suitable screw 59, the outer end of the shaft 55 having fixed to it a pinion 60 of the same pitch but half the number of teeth as that of the gear 54. The pinion 60 engages a rack 61 fixed to the rear plate 41 of the cable control carriage 39 by suitable screws 62. By this arrangement as the boring bar driving carriage 26 feeds along the bed the rack 52 fixed thereon will cause gear 54 to rotate while the gear 60 being half the size of the gear 54 will in turn cause the rack 61 and therefore the cable control carriage 39 to move in the same direction but at half the speed of the carriage 26.

Figure 6:
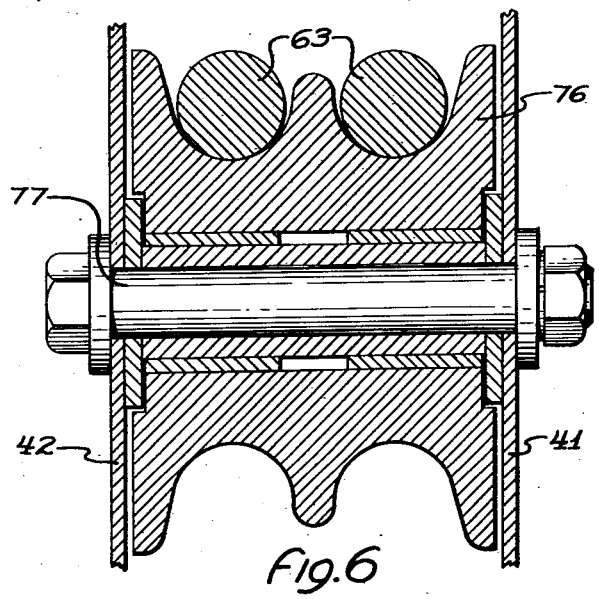
Fig. 6 is a section on the line 6—6 of Fig. 4.
Figure 7:
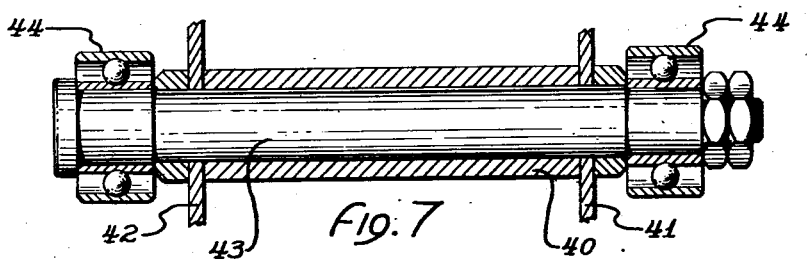
Fig. 7 is a section on the line 7—7 of Fig. 4.

Two multiple conductor cables 63 have one of their ends fixed at 64, Fig. 3, to the end 65 from where the wires and individual leads in the conductor cables 63 are connected through suitable conduits 66 to the electrical junction box 67 from which leads go to the headstock driving means for the headstock 16, the drive motor 28 for feeding the carriage 26 and the coolant pump equipment for supplying coolant to the coolant seal boring bar rest 23. The other ends of the cables are clamped at 68 to the bracket 69 fixed to the junction box 70 carried on the boring bar driving carriage 26 and movable therewith. The cables 63 are looped over the control pulley 71 having the grooves 72a to receive and guide the cables 63 over the periphery thereof. The control pulley has suitable bearing bushings 72 journaled on the sleeve 73 surrounding the bolt 74, Fig. 5, which is carried rigidly in the rear plate 41 and the front plate 42 of the cable control carriage 39. The cables 63 coming off or entering on the bottom of the control pulley 71 normally lie on the surfaces 75 of the trough members 33 and 34 as best seen in Fig. 5 while the cables coming off of or entering on to this control pulley 71 are supported on support rollers 76, Fig. 6, suitably journaled on bolts 77 carried in the cable control carriage 39, so that the cables 63 may relatively move longitudinally of the control carriage 39 with a minimum of frictional loss to freedom of movement of the carriage 26 so that there will be no change in the feed rate thereof caused by the cable control mechanism described.

Referring to Figs. 8, 9 and 10, in Fig. 8 is shown the relative position of the essential elements of this device when the boring bar driving carriage 26 is at the beginning of the cut such as is shown in Fig. 1. At this time the cables 63 which are secured to the bed or frame of the machine at 64 and which are secured at their other ends at the point 68 of the boring carriage 26, they are looped over snugly the pulley 71 journaled on the cable control carriage 39 at the point 74, the upper portion of the cables coming off of the pulley 71 being supported on the rollers 76 while the lower portion of the cables coming off of the pulley 71 lie on the surfaces 75 of the trough 32.

As the carriage feeds to an intermediate position such as shown in Fig. 9 the point 68 overtakes the cable control carriage 39 at twice the rate of movement of the carriage 39 as caused by the positive control affected through the gears 54—60 and the respective racks 52—61 as described. Thus, the same tension is maintained and the proper orderly position of the cables 63 is maintained at any intermediate position of travel of the carriage 26. Finally, as the carriage arrives at the end of its boring stroke as shown in Fig. 10 all of the upper portion of the power control cables 63 have been picked up by the bracket at the point 68 from the rollers 76 and the carriage has arrived at the other end of the machine but now the boring bar carriage 26 is at the other end of the cable control carriage 39 as shown and all of the cable is then payed out and lying in the bottom 75 of the trough 32. The reverse of course occurs as the carriage 26 is retracted by rapid traverse back to its initial starting position such as shown in Fig. 8.

Thus, a very careful control and proper tension maintenance is at all times present in the cable control carriage 39 movement by the positive 2 to 1 ratio drive through the gearing 54—60 while at no point in the movement of the cable is there any rubbing or abrasive action occurring since the cable rolls on and off of the control pulley 71 without any friction and the guide rollers 76 allow relative movement of the cables 63 with regard to the cable control carriage 39 on the anti-friction rollers 76. Thus, a fully anti-friction device is provided which also keeps the cables in proper order at all times for any position of relative movement of the boring bar driving carriage 26 on the bed 15 of the machine.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A cable carrier for a machine tool having an elongated bed, a tool carriage longitudinally movable on said bed, a cable trough fixed longitudinally on said bed, a cable control carriage movable longitudinally of said trough, a cable control pulley journaled on said cable control carriage, an electric power cable looped over said pulley, means securing one end of said cable to said bed, means securing the other end of said cable to said tool carriage, and a differential drive gearing connected between said bed and said cable control carriage actuated by the movement of said tool carriage to move said cable control carriage at a different rate of travel than the rate of travel of said tool carriage comprising a rack fixed on said bed, a rack fixed on said cable control carriage, a larger gear engaging said bed rack, a smaller gear engaging said carriage rack, each of said gears being coaxially connected together and rotatably journaled on said tool carriage.

2. A cable carrier for a machine tool having a bed, a tool carriage movable on said bed, a control panel on said tool carriage, a power cable, means on said bed to secure one end of said cable, a trough fixed on said bed having bottom surfaces in horizontal alignment with the point of securing the end of said cable to said bed and extending longitudinally of said bed therefrom, a cable control carriage slidably mounted for longitudinal relative movement on said trough, a differential drive connection between said bed and said cable control carriage actuated by the movement of said tool carriage on said bed comprising a rack fixed longitudinally of said bed, a gear engaging said rack, a shaft fixed to said gear journaled on said tool carriage, a pinion fixed to said shaft, and a rack fixed longitudinally of said cable control carriage engaged by said pinion, a cable control pulley journaled at the end of said cable control carriage opposite from the point of securing of said control cable to said bed, said control cable being looped up over said pulley from said bottom surfaces of said trough and connected at its other end to said tool carriage.

3. A cable carrier for a machine tool having a bed, a tool carriage movable on said bed, a control panel on said tool carriage, a power cable, means on said bed to secure one end of said cable, a trough fixed on said bed having bottom surfaces in horizontal alignment with the point of securing the end of said cable to said bed and extending longitudinally of said bed therefrom, a cable control carriage slidably mounted for longitudinal relative movement on said trough, a differential drive connection between said bed and said cable control carriage actuated by the movement of said tool carriage on said bed comprising a rack fixed longitudinally of said bed, a gear engaging said rack, a shaft fixed to said gear journaled on said tool carriage, a pinion fixed to said shaft, a rack fixed longitudinally of said cable control carriage engaged by said pinion, a cable control pulley journaled at the end of said cable control carriage opposite from the point of securing of said control cable to said bed, said control cable being looped up over said pulley from said bottom surfaces of said trough and connected at its other end to said tool carriage, support rollers journaled on and spaced longitudinally along the top edge of said cable control carriage to rotatably support said control cable extending from the top portion of said cable control pulley.

References Cited in the file of this patent
UNITED STATES PATENTS

| | | |
|---|---|---|
| 2,201,954 | Flygare | May 21, 1940 |
| 2,295,079 | Groene | Sept. 8, 1942 |
| 2,395,485 | Jones | Feb. 26, 1946 |

FOREIGN PATENTS

| | | |
|---|---|---|
| 874,209 | Germany | Apr. 20, 1953 |